Aug. 19, 1930.  A. GODEL  1,773,224
ABSORPTION APPARATUS
Filed Aug. 19, 1927  3 Sheets-Sheet 1

Inventor:—
Albert Godel,
By: Smith & Michael,
Attorneys.

Aug. 19, 1930.　　　　A. GODEL　　　　1,773,224
ABSORPTION APPARATUS
Filed Aug. 19, 1927　　　3 Sheets-Sheet 2
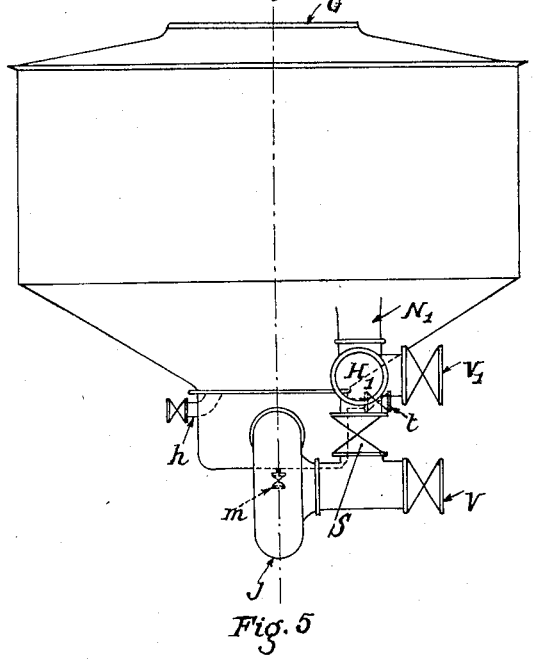
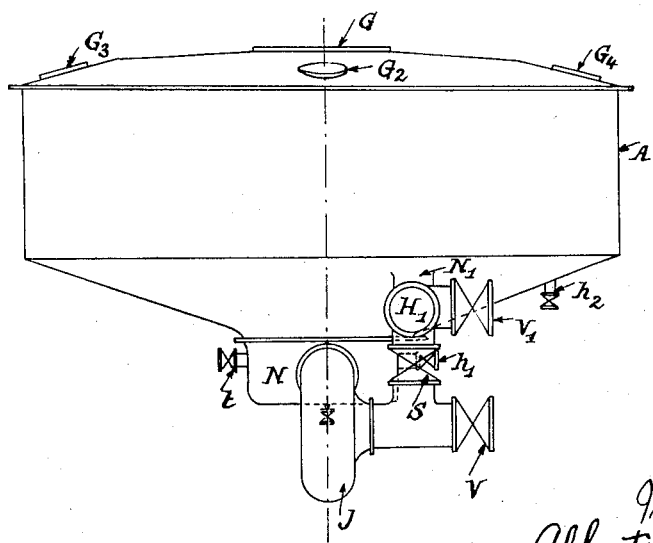
Inventor:—
Albert Godel,
By:— Smith & Michael,
Attorneys.

Aug. 19, 1930.　　　A. GODEL　　　1,773,224
ABSORPTION APPARATUS
Filed Aug. 19, 1927　　3 Sheets-Sheet 3

Inventor:
Albert Godel,
By: Smith & Michael,
Attorneys.

Patented Aug. 19, 1930

1,773,224

UNITED STATES PATENT OFFICE

ALBERT GODEL, OF LAGNIEU, FRANCE, ASSIGNOR TO SOCIÉTÉ DE RECHERCHES & D'EXPLOITATIONS PETROLIFÈRES, OF PARIS, FRANCE, A FRENCH JOINT-STOCK COMPANY

ABSORPTION APPARATUS

Application filed August 19, 1927, Serial No. 214,102, and in France March 21, 1927.

This invention relates to the separation and recovery of gases and vapors by absorbent solids.

The invention has for its object to provide improved absorption apparatus especially suitable for carrying out the process of separation and recovery described in my application for patent filed June 23rd, 1926, Serial No. 118,007, which has matured into Patent No. 1,717,103.

The invention has also for its object to provide absorption apparatus which by its internal arrangement allows the direct treatment of heated air or gases, of which it ensures adequate cooling during treatment. Another object is to provide absorption apparatus suitable for the treatment of rich gases, that is, gases containing a high percentage of the products to be recovered, the apparatus being adapted to prevent excessive rise of temperature of the absorbent mass due to the absorption of such high percentage of the products.

Other objects of the invention are to construct the apparatus in a self-contained group or unit, and to obviate the use of steam superheaters or of coils embedded in the mass of absorbent material.

The improved apparatus is easy to install and all parts thereof are accessible for repair, which is not the case in absorbers of the kind having heating coils embedded in the mass of absorbent material.

The annexed drawings, to which reference will be made in the following description, represents two alternative forms of apparatus arranged in accordance with the present invention.

Figure 2 is a corresponding elevation seen at right angles to Figure 1.

Figure 5 is a corresponding elevation seen at right angles to Figure 4.

For each apparatus, the same reference letters have been adopted in order to designate the same elements.

Figure 1:
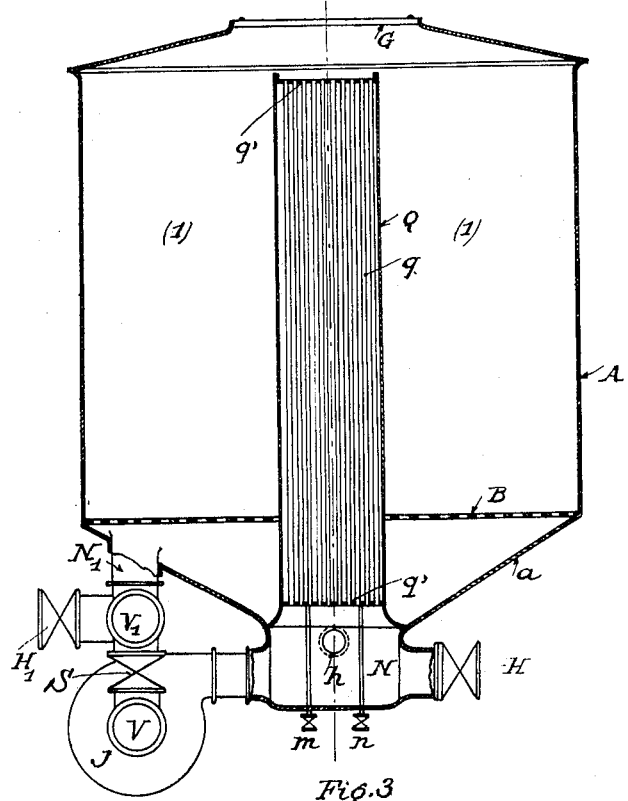
Figure 1 shows in diametrical, vertical section, an absorber provided with a single tubular body for heating or cooling.
Figure 3:
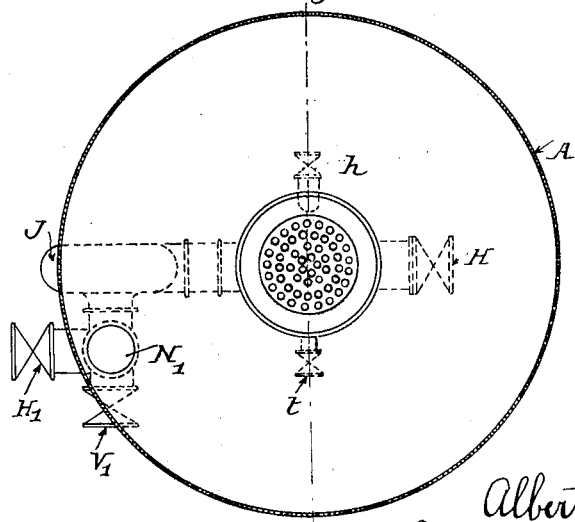
Figure 3 is a plan thereof, the cover and the bottom grating being removed.

The absorber with a single tubular body, Figures 1 to 3, is particularly well suited for the recovery of benzol contained in lighting gas, volatile solvents in air, and gasoline from natural gas; it presents, as compared with the former apparatus, the advantages of more economical construction and greater efficiency for a given volume of the heater.

The novel apparatus, acting as filter or absorber, is constituted by a vessel A, preferably of cylindrical shape, with a frustro-conical bottom $a$, pressure-tight to gas or steam and intended to contain the absorbent material.

This material is arranged upon a grating B forming a false bottom and cut away at its centre to allow passage for a vertical cylindrical body Q, forming a central core-space or compartment, concentric with the vessel A, containing a nest of tubes $q$ connected at each end to a tube-plate $q'$ and resting upon a header N attached to the bottom $a$.

The nest of tubes $q$ provides communication through the interior of the tubes between a pipe fitting or flange connection having a valve H for the supply of gas, carried by the header N, and the upper surface of the absorbent material.

The cover of the vessel A may be detachable or be simply provided with a manhole G of a diameter sufficient for the withdrawal of the cylindrical body Q. The side wall of the vessel A can likewise be provided with one or more manholes, not shown in the drawing, in order to allow the removal of the absorbent material.

The bottom $a$ carries near its outer rim a pipe junction $N_1$ giving access by a four-way union:—

(1) To the gas exit, by way of the valve $H_1$;
(2) To the air exit, by way of the valve $V_1$;
(3) To the fan J, by means of a valve S for controlling the circulation, this fan delivering into the header N.

At V there is arranged a valve for the admission of air to the pipe or T-piece connecting the valve S with the fan J.

The heating of the nest of tubes $q$ is obtained by means of steam admitted around the tubes $q$ of the nest at one of its ends $m$ and discharged at the other end $n$; the cooling is effected by means of cold water circulating in the opposite direction.

The method of operation may be as follows, this being given merely by way of example as it is possible by slight modifications of detail to adapt the same apparatus to different processes, without exceeding the scope of the invention.

In the first phase, which is the period of absorption, the valves S, V, $V_1$ are closed and the valves H, $H_1$ opened; the gas to be treated enters by the valve H, passes upwardly through the nest of tubes $q$ (which is cooled if necessary by water, if the gas is hot), expands through the mass of activated carbon (1) and after following a descending path, emerges through the pipe $N_1$ and the valve $H_1$.

If the gas under treatment is very rich in the product to be absorbed, there may be evolved a quantity of heat capable of raising substantially the temperature of the absorbent and of interfering with efficient absorption. This drawback, which occurs frequently with known apparatus, may be readily obviated by the arrangement according to the present invention. In practice, in the particular case considered, the circulation valve S will be opened and the fan J operated, while setting up a circulation of cold water around the tubes $q$ of the nest of tubes. It will be understood that by these means it is possible to dilute the primary gas with one or more times its volume, if there is produced through the fan a circulation equal to or greater than the actual quantity of gas arriving through the valve H; the heating of the absorbent material can in this way be rendered negligible, without any disadvantage.

When the saturation of the absorbent mass has attained a sufficient value, the circulation of the gas to be treated is interrupted by closing the valves H and $H_1$.

The next phase of the operation is the "preheating" of the absorbent and of the metallic masses of the apparatus, this second phase having the object of reducing or obviating condensation of water during the further treatment with steam. This preheating is effected by means of gaseous currents intended to convey the heat units in the manner explained in the British patent specification No. 267369 dated June 10th, 1926.

In the apparatus according to the present invention, in order to give rise to the gaseous currents, the circulation valve S is opened and the fan J is then set in operation, in such a way that the gas contained in the apparatus passes round the circuit S, J, N, $q$, (1), $N_1$, S; in the meantime, the nest of tubes $q$ is raised to a high temperature, for example by steam under pressure, the vapor of petroleum, etc.; thus the gas is heated at each passage through the said nest of tubes and conveys the heat units into the absorbent material, which rapidly attains a temperature higher than 100° C. The material as a whole commences to give off the absorbed products, which flow out through a pipe $h$ fitted with a valve opening into the refrigerating condenser.

In certain applications, it will not be necessary or even advantageous to introduce steam directly into the absorbent mass; in this case the heating of the absorbent will be continued by circulation of the gases through the nest of tubes $q$, and the overflow of these gases will be discharged to the refrigerating condenser. There may likewise be arranged between the valves V and $V_1$ a special condenser of low resistance, the valve S being then closed in such a way as to compel the gas charged with distilled products to pass through this condenser. This method will be particularly applicable to the recovery of alcohol, ether, etc., which solvents it is necessary to avoid hydrating by contact with steam.

In other applications, such as the stripping of benzol from coal gas, the recovery of gasoline from natural gases, etc., the next step after the preheating indicated above will be the direct heating with steam, as there is no disadvantage in mixing steam with the recovered product.

The steam under low pressure, superheated or not, is then introduced through the orifice $t$ carried by the header N. If the valve S is closed and the fan J stopped, this steam becomes further superheated in passing through the nest of tubes $q$, and after passing through the absorbent material leaves by the pipe $h$, passing thence to the refrigerating condenser and carrying with it a large proportion of the recovered product. It is moreover possible to improve the thermal efficiency by causing a circulation of steam in closed circuit by the opening of the valve S and the operation of the fan J; this circulation brings about a more perfect contact of the steam throughout the absorbent and communicates to it a greater number of heat units; there results a thorough "washing" of the absorbent by the steam, the over-flow passing off with the recovered product into the refrigerating condenser.

When the steam leaving by the pipe $h$ no longer carries with it substantially any recovered product the introduction of steam is stopped and the orifice $t$ is closed together with the pipe $h$. The absorbent material is then dried by means of gas already treated or by means of air.

In the first case, it will suffice to open the valves H and $H_1$ and to introduce steam around the tubes $q$ of the nest of tubes; the gas heated by its passage through these tubes comes into contact with the absorbent material and effects its drying by evaporating and carrying off the moisture.

In the second case, the valves V $V_1$ are opened, the valve S is closed and the fan J is started so as to suck in dry air at V, to force it through the nest of tubes $q$ heated by steam, and to discharge the air with contained moisture at $V_1$.

In order to cool the dried carbon, it suffices in both the cases considered above, to replace the steam by cold water around the tubes $q$ of the nest of tubes; if air is employed, the fan J will be maintained in action.

Lastly, when the absorbent is sufficiently cooled, the current of cooling air or gas is interrupted and the circulation of the gas to be treated is re-established. The cycle of operations is thus complete.

In certain installations it is preferable for greater simplicity to replace the fan by a steam injector, but the mechanical efficiency of this latter apparatus is notably lower than that of a fan.

Figure 4:
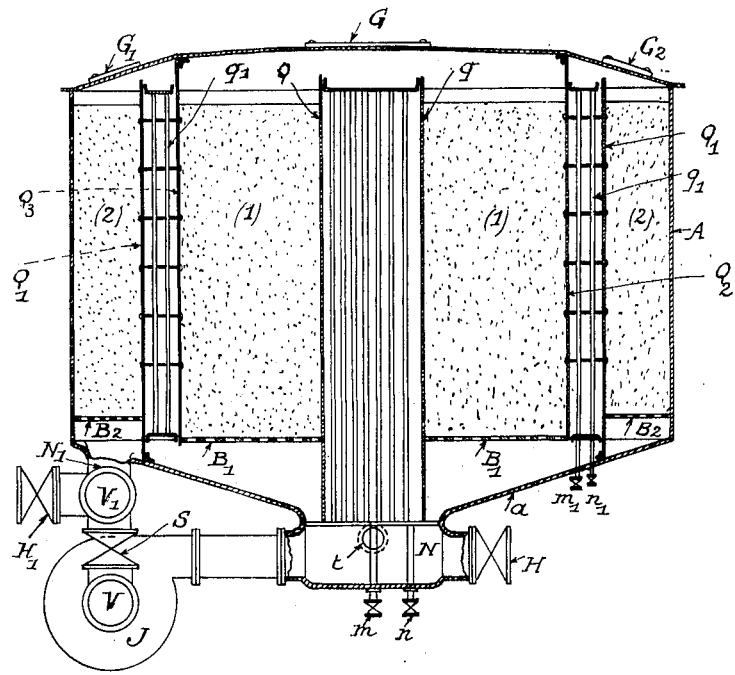
Figure 4 represents in diametrical vertical section an absorber provided with two tubular bodies, the one central, the other annular.
Figure 6:
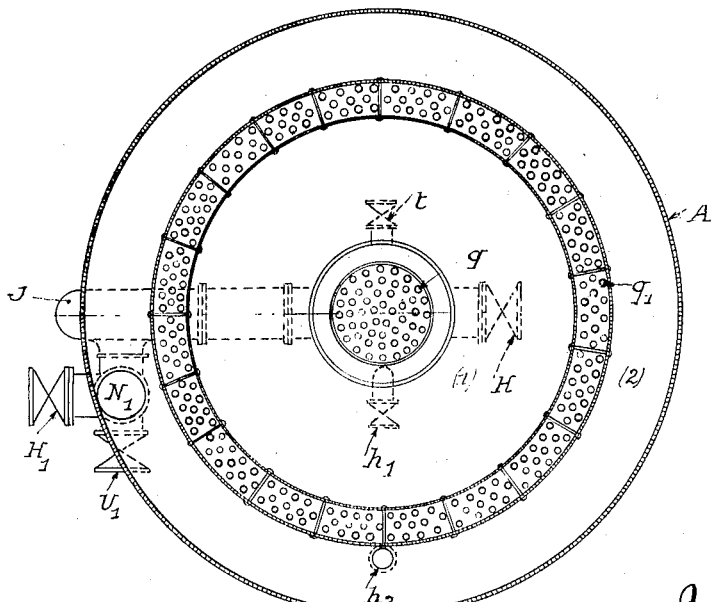
Figure 6 is a plan thereof, the cover and the bottom gratings of the apparatus being removed.

The two-compartment absorber with heating by two nests of tubes, represented in Figures 4, 5 and 6 of the drawings, is more particularly adapted to the absorption of "rich gases" with sensible heating upon absorption, such as certain natural gases with a high content of gasoline. It may be provided with a fan, as shown in the drawing, or the fan may be omitted; in the second case, however, the efficacy of the nests of tubes is less than in the first case, as the gaseous exchanges in nests of tubes decreases very rapidly with a fall in the speed of the gases circulating through the tubes.

The improved apparatus, acting as filter or absorber, is constituted by a vessel A preferably of cylindrical shape, with a frusto-conical bottom $a$, pressure-tight to gas or steam, and intended to contain the absorbent material.

In addition to the central nest of tubes $q$, described with reference to Figures 1 to 3, the vessel A is provided with a nest of tubes $q_1$ arranged in very thin annular form, contained between two concentric cylindrical casings $Q_1$ $Q_2$; these casings are suitably stayed apart and their entire peripheries are bolted in a pressure-tight manner, the one $Q_1$ to the bottom $a$ and the other $Q_2$ to the cover of the vessel A. The nest of tubes $q_1$ is mounted at each end in a tube plate in the form of a crown or ring fitting between the casings $Q_1$ $Q_2$.

The absorbent material is arranged in the two compartments (1) and (2) thus constituted and rests upon the bottom gratings $B_1$ $B_2$.

There is thus free circulation between these compartments by way of the nest of tubes $q_1$.

The cover of the absorber may be removable or may simply carry a manhole G of a diameter sufficient for the withdrawal of the nest of tubes $q$, and manholes $G_1$ $G_2$ $G_3$ $G_4$— allowing the filling or packing of the absorbent material. The cylindrical part of the vessel A can likewise be provided with one or more manholes, not shown in the drawing, in order to allow the removal of the absorbent material.

The nest of tubes $q$ provides communication through the interior of the tubes between the pipe fitting carrying the valve H for the supply of the gases, mounted upon the header N, and the upper surface with the absorbent mass contained in the compartment (1).

The bottom $a$ of the vessel A carries upon its periphery a pipe junction $N_1$ giving access by a four-way union:—

(1) To the gas-exit, by way of the valve $H_1$;
(2) To the air-exit, by way of the valve $V_1$;
(3) To the fan J, by means of a valve S, this fan delivering into the header N.

At V there is arranged a valve for admitting air to the pipe or T-piece connecting the valve S with the fan J.

The heating of the central nest of tubes $q$ is obtained by means of steam introduced into the space around the tube at one of its extremities $m$ and discharged at the other extremity; the cooling of the same nest of tubes is obtained by means of cold water circulating in the opposite direction and discharged at $n$. The heating or cooling of the annular nest of tubes $q_1$ is effected in the same way by the introduction and discharge of steam or cold water at the ends $m_1$ $n_1$. The extremities $m$ $m_1$, $n$ $n_1$, can be mounted respectively in parallel upon the same pipes.

The absorber carries at its base a pipe fitting $h_1$ for the discharge of condensate arising from the absorbent mass (1), and a pipe fitting $h_2$ for the discharge of condensates or vapours derived from the absorbent mass (2).

The operation and working of this apparatus are identical with those of the absorber described with reference to Figures 1 to 3, the only difference residing in the fact that the absorbent mass is divided into the two compartments arranged in series.

Consequently, if the gas leaving the absorbent mass (1) is heated by absorption, it can be cooled in the nest of tubes $q_1$ and serve for satisfactory absorption in the absorbent mass (2).

There is thus provided a more efficient heating or cooling of the absorbent material for the same speed of circulation, which will allow the treatment of gases which are very rich in the products to be absorbed.

There may likewise be provided apparatus having two or three concentric nests of tubes arranged in annular formation.

Lastly, with the object of obviating the construction of an annular nest of tubes like $q_1$, Figures 4 to 6, there may be constructed an absorber of round, oval or rectangular shape, divided into two or more juxtaposed compartments; the passage from one compartment to another will in this case always take place through a nest of tubes of a suitable kind, and the closed-circuit circulation of the gases will be effected by means of a fan, an injector, an exhauster or the like.

Moreover, the nests of tubes mentioned in the above description may, without departing from the invention, be replaced by heating surfaces of any kind, such as coils, electrical resistances, etc.

What I claim is:—

1. Absorption apparatus comprising a chamber containing absorbent material, said chamber having a core-space devoid of absorbent material, temperature-exchanging means occupying said core-space, a header in communication with one end of said core-space, the other end of said core-space being in communication with one end of said chamber, and means for the passage of gaseous mixture from the other end of said chamber, through said header and said core-space, to the first mentioned end of said chamber.

2. Absorption apparatus comprising a chamber containing absorbent material, said chamber having a central core-space devoid of absorbent material, temperature-exchanging means located in said core-space, a header in communication with one end of said core-space, the other end of said core-space being in communication with one end of said chamber, a pipe connection from the other end of said chamber, and a circulating device arranged between said pipe connection and said header.

3. Absorption apparatus comprising a chamber containing absorbent material, said chamber having a central core-space devoid of absorbent material, temperature-exchanging means occupying said core-space, a header in communication with one end of said core-space, the other end of said core-space being in communication with one end of said chamber, a pipe connection from the other end of said chamber, and a circulating device arranged between said pipe connection and said header, said circulating device adapted for passing a gaseous mixture and air at will through said heater, said core-space and the absorbent material in said chamber.

4. Absorption apparatus comprising a chamber containing absorbent material, said chamber having a core-space devoid of absorbent material, temperature-exchanging means located in said core-space, a header in communication with one end of said core-space, the other end of said core-space being in communication with one end of said chamber, a pipe connection from the other end of said chamber, and a circulating device arranged between said pipe connection and said header, said temperature-exchanging means adapted for the heating and cooling at will of fluids circulating through said core-space.

5. Absorption apparatus comprising a chamber containing absorbent material, a core-space within said chamber, a second chamber containing absorbent material, said second chamber surrounding the first mentioned chamber and being separated therefrom by an annular space, temperature-exchanging means located in said core-space and said annular space, and means for the passage of gaseous mixture through said core-space, then through the absorbent material in the first of said chambers, next through said annular space and through the absorbent material in the other of said chambers.

6. Absorption apparatus comprising a first chamber containing absorbent material, a compartment within said chamber, a second chamber containing absorbent material, said second chamber being juxtaposed to said first chamber, a compartment within said second chamber, temperature-exchanging means occupying both of said compartments, and means for the passage of gaseous mixture through the first of said compartments, then through the absorbent material in said first chamber, next through the second of said compartments, and through the absorbent material in said second chamber.

7. Absorption apparatus comprising a chamber containing absorbent material, said chamber including an interior compartment and a nest of tubes within said compartment, means for circulating gaseous mixture through said nest of tubes and said chamber, and means for circulating through said compartment and around the tubes a fluid adapted to regulate the temperature of said gaseous mixture passing through said nest of tubes.

8. Absorption apparatus comprising a chamber, a compartment within said chamber, a nest of tubes located in said compartment, said nest of tubes serving for the passage of gaseous mixture circulating between opposite ends of said chamber, said compartment adapted for the circulation around the tubes of said nest of a fluid adapted to control the temperature of said gaseous mixture, and means external to said chamber and compartment for circulating said gaseous mixture from one end of said chamber, through said nest of tubes and back to the opposite end of said chamber.

9. Absorption apparatus comprising a chamber, a grating within said chamber, said grating supporting absorbent material, said chamber including a compartment extending from below said grating towards the top of said chamber, tubes arranged longitudinally within said compartment, tube-plates supporting said tubes at the respective ends of said compartment and means for circulating gaseous mixture through said tubes and through said absorbent material and grating, said tubes being surrounded by a fluid regulating the temperature of said mixture in its passage through said tubes.

10. Absorption apparatus comprising a chamber, a grating within said chamber, said grating supporting absorbent material, said chamber including a compartment extending from below said grating towards the top of said chamber, temperature-exchanging means located in said compartment, a header located at the bottom of said chamber and in communication with the lower end of said compartment, the upper end of said compartment being in free communication with the top end of said chamber, and means for the passage of gaseous mixture from the lower end of said chamber, through said header and said compartment, to the top end of said chamber, and down through said absorbent material and said grating, in a closed cycle of circulation.

In witness whereof I have hereunto affixed my signature.

ALBERT GODEL.